US012599995B2

(12) United States Patent
Elias Cabrera et al.

(10) Patent No.: US 12,599,995 B2
(45) Date of Patent: Apr. 14, 2026

(54) DEVICE OR TOOL FOR GRIPPING A LINER TO REMOVE SAME FROM AND INSTALL SAME IN THE SHELL OF A MILL, METHOD FOR INSTALLING A LINER AND METHOD FOR REMOVING A LINER

(71) Applicant: MI ROBOTIC SOLUTIONS S.A., Santiago (CL)

(72) Inventors: Igor Sebastián Elias Cabrera, Santiago (CL); Carlos Roberto Muñoz Rosas, Santiago (CL); Mario Francisco Poblete Gutiérrez, Santiago (CL)

(73) Assignee: MI ROBOTIC SOLUTIONS S.A., Santiago (CL)

( * ) Notice: Subject to any disclaimer, the term of this patent is extended or adjusted under 35 U.S.C. 154(b) by 869 days.

(21) Appl. No.: 17/753,469

(22) PCT Filed: Sep. 3, 2019

(86) PCT No.: PCT/CL2019/050083
§ 371 (c)(1),
(2) Date: Mar. 3, 2022

(87) PCT Pub. No.: WO2021/042220
PCT Pub. Date: Mar. 11, 2021

(65) Prior Publication Data
US 2022/0324070 A1 Oct. 13, 2022

(51) Int. Cl.
B23P 19/06 (2006.01)
B02C 17/22 (2006.01)
(Continued)

(52) U.S. Cl.
CPC .............. B23P 19/06 (2013.01); B02C 17/22 (2013.01); B23P 6/00 (2013.01); B23P 19/105 (2013.01);
(Continued)

(58) Field of Classification Search
CPC ................. B02C 17/22; Y10T 29/4973; Y10T 29/49819; Y10T 29/49998; B23P 6/00;
(Continued)

(56) References Cited

U.S. PATENT DOCUMENTS 3,752,338 A * 8/1973 Bartell .................... B66C 13/18
414/732
2008/0224491 A1* 9/2008 Gillespie ........... H01L 21/68707
294/106
(Continued)

FOREIGN PATENT DOCUMENTS

CN 204329892 U * 5/2015
WO 2013036194 A1 3/2013
(Continued)

OTHER PUBLICATIONS

International Search Report for Application No. PCT/CL2019/050083, mailing date Jan. 17, 2020.
(Continued)

*Primary Examiner* — Jermie E Cozart
(74) *Attorney, Agent, or Firm* — Gottlieb, Rackman & Reisman, PC

(57) ABSTRACT

A device or tool that is configured for gripping a liner in order to to remove the liner, and install the liner in the shell of a mill. The device includes, a rigid structure or frame forming a support for containing the components, a coupling element that allows the device to be secured or disposed on at least one end of a manipulation device, such as a robotic manipulator, and at least one claw or pincer for holding at least one bolt by the head. The tool is designed to allow the adjustment of the relative position thereof in order to align the pincers to the positions of the holes of each liner. The at least one claw is configured to allow the at least one claw to open and close so as to adjust the size of the claw opening to the size of the bolt being gripped. The at least one pincer (Continued)

or claw has at least one sensor, thereby enabling mill liners to be installed and removed.

11 Claims, 4 Drawing Sheets

(51) Int. Cl.
  *B23P 6/00*      (2006.01)
  *B23P 19/10*     (2006.01)
  *B25J 15/08*     (2006.01)
  *B25J 19/02*     (2006.01)
  *B23P 19/12*     (2006.01)
  *B25J 15/02*     (2006.01)

(52) U.S. Cl.
  CPC ............... *B25J 15/08* (2013.01); *B25J 19/02* (2013.01); *B23P 19/12* (2013.01); *B25J 15/0213* (2013.01); *B25J 15/024* (2013.01); *B25J 19/022* (2013.01); *B25J 19/023* (2013.01); *Y10T 29/4973* (2015.01); *Y10T 29/49819* (2015.01); *Y10T 29/49998* (2015.01)

(58) Field of Classification Search
  CPC ......... B23P 19/06; B23P 19/105; B23P 19/12; B25J 15/0213; B25J 15/024; B25J 19/022; B25J 19/023
  See application file for complete search history.

(56)        References Cited

U.S. PATENT DOCUMENTS

| | | | |
|---|---|---|---|
| 2010/0101356 A1* | 4/2010 | Albin ................... | B25J 15/0213 |
| | | | 901/1 |
| 2013/0068387 A1* | 3/2013 | Lavalley ................. | B26D 7/02 |
| | | | 29/458 |
| 2013/0140387 A1 | 6/2013 | Fernandez et al. | |
| 2019/0176348 A1* | 6/2019 | Bingham ............... | B25J 9/1612 |
| 2020/0016773 A1* | 1/2020 | Lee ....................... | B25J 15/0253 |

FOREIGN PATENT DOCUMENTS

| | | | |
|---|---|---|---|
| WO | 2015010163 A1 | 1/2015 | |
| WO | 2018157201 A1 | 9/2018 | |
| WO | 2019153052 A1 | 8/2019 | |

OTHER PUBLICATIONS

Written Opinion for Application No. PCT/CL2019/050083, mailing date Jan. 17, 2020.

* cited by examiner

DEVICE OR TOOL FOR GRIPPING A LINER TO REMOVE SAME FROM AND INSTALL SAME IN THE SHELL OF A MILL, METHOD FOR INSTALLING A LINER AND METHOD FOR REMOVING A LINER

FIELD OF THE INVENTION

The present invention is comprised among equipment associated with mills for ore grinding in the mining industry, particularly to replacing wear elements, such as mill liners or shields.

The invention preferably relates to a device or tool for gripping a liner to remove same from, and install same in, the shell of a mill the configuration thereof allowing the performance of said change in an automated and remote manner without staff intervention, furthermore ensuring the correct insertion of each liner, achieving a greater degree of certainty and efficacy, therefore optimising the time that the mill is halted for maintenance, and preventing the exposure of maintenance staff to the risks associated with this type of method.

BACKGROUND OF THE INVENTION

Grinding is a process which allows reducing size of the ore used in ore concentration processes, for which mills comprising an inner surface lined by liners or shields of a different type and shape according to their location on the inner surface of the mill, are used.

Liners are subjected to constant wear due to the impact of ore and grinding means thereon, so they must be changed periodically.

In the art, the changing of liners requires the use of tools or devices that are usually operated by staff directly in the changing area to help in positioning and guiding the liners, with this being a high-risk process for the staff involved in the changing operation, as well as incurring a great deal of time associated with the maintenance operation.

The process of changing inner liners of mills requires carrying out a series of operations such as the installation of systems, devices, and/or tools which allow manipulating the liners, wherein coordination of a number of staff members and a rigorous operation are needed to introduce the manipulator into the mill, with said systems or equipment usually having a large size and span; the knocking out of bolts, an operation which must be performed from outside the mill by staff and equipment for cutting nuts and knocking out bolts, is then carried out, where these bolts generally fall into the mill; once the bolts have fallen into the mill, worn liners are pushed such that they fall into the mill; used liners are removed by means of the liner manipulator mounted at the end of a means which allows accessing the location of the removed liner to engage said liner and remove it from inside the mill; and installation of new liners.

The methods and equipment used in the art for the liner changing process have a series of drawbacks and problems which impact production, as well as the occupational health and safety of the staff.

The main activities influencing the enormous amounts of time lost in performing the maintenance task of replacing liners are related to the loosening and knocking out of liner clamping bolts, the actual removal of the liners, and the installation of new liners. The low speed of the hydraulic oil equipment used in the art prevents said equipment from being more efficient in the time used for performing the maintenance task, and where a weak fixing of liners in the bolts will cause the loosening thereof, favouring pulp leakages, and it will also cause liners to fall, and therefore unscheduled halting and production loss.

The current method generally involves the staff going into the mill, which is intrinsically risky, working at height, and being exposed to the possibility of the ore or manual tools falling from the mill itself, among others. The maintenance staff must intervene in the handling of the liners in order to change said liners, which is physically demanding and involves the risks of getting hit or trapped while removing and inserting liners.

National application 199401723 (CORPORACION NACIONAL DEL COBRE DE CHILE) with filing date 22 Nov. 1994 describes a device which allows securing liners in the walls of ore grinding mills by means of a mobile manipulator comprising a head and claw assembly attached to the end of the manipulator, the assembly being configured by a base plate having a hydraulic cylinder which actuates hooks to directly engage the ears of a liner. The difference with the present invention is related to the configuration of the device and the way of operating which is based on gripping and/or handling the liner (bolt) holding means with respect to the surface of the mill casing, through which said liner is moved for its installation and/or removal.

On the other hand, national application 201400847 (METSO MINERALS), with publication date 23 Jan. 2015 and granted under registration number 56440 dated 24 Aug. 2018, describes a manipulation device for a grinding mill liner element, comprising at least one attachment element disposed for being attached to said liner element, and a lifting element adapted for being connected to lifting means to raise said manipulation device, the lifting element having an adjustable lifting point such that said manipulation device can be adapted with respect to the centre of gravity of said liner element. With the configuration of said manipulation device, direct staff intervention is required in disposing the manipulator for securing to the liner and proceeding with the manipulation thereof, incurring a great deal of time associated with the maintenance operation and longer exposure of the staff to risk conditions.

A device which allows lifting coverings for installation thereof in grinding cylinders is described in national application 201802449 (CAUCHOS INDUSTRIAL S.A.), with publication date 14 Dec. 2018, said device being made up of a beam with a rounded section having at its two ends machined slots which are longitudinal with respect to the axis thereof, two straight eyebolts made up of an eye and a stud in which the eye has a radial perforation, an electric hoist having two handles with which it is movably secured to the beam, two locks assembled in the beam, and a system for holding the covering attached to the hoist by means of a cable, which is made up of: a frame, two secured lower jaws assembled in the frame, two mobile upper jaws assembled in the frame, a worm screw mechanism located on the mobile upper jaws, and a bracket-type part located in the centre of the upper portion of the frame. This device requires staff intervention for installation thereof in the orifice going through the mill casing instead of in the location where the liner to be changed was removed, so direct intervention of maintenance staff inside the mill is necessary, incurring a great deal of time associated with the maintenance operation and longer exposure of the staff to risk conditions.

Application WO2018/157201 (RUSSEL MINERAL EQUIPMENT PTY) published on Jul. 9, 2018 describes a method of removing a liner fastened to a mill shell by at least one liner bolt, the method including driving the at least one liner bolt through the mill shell until it becomes retained in the liner, whereby in a retained position, a head of the at least one liner bolt is exposed so as to project proud of the liner towards an interior of the mill; engaging a tool onto the at least one liner bolt; and, lifting the liner away from the mill shell using the tool to thereby enable the liner to be removed from the mill. The tool is connected to a manipulator which allows controlling the movement thereof as needed, wherein said tool is configured by a plate defining a body including a plurality of spaced apart teeth defining slots therebetween for receiving at least a portion of the head of respective liner clamping bolts.

However, the configuration of said tool disclosed by Russel requires manipulating the position of the tool with respect to the liner by means of the manipulator during operation, such that the liner bolts projecting proud of the liner are aligned with the suitable slots of the tool to then be lifted to engage the bolts from below, whereby the manipulator must be raised to remove the liner from its position. However, the configuration of the described tool still does not allow safely handling the removal of liners from their position in the mill casing, since there is a need to expose part of the liner securing bolt for the engagement thereof, an action that is usually carried out outside the mill by hitting the bolts either manually or else with another type of tool, which means that said action entails a liner detachment risk, which will cause the liner to fall into the mill. In addition to the above, since the slot has fixed dimensions, there is a risk of bolts, which may sustain deformation or wear, not being able to be correctly and firmly engaged, which translates into a risk since the bolts are not firmly retained in said tool for moving the liner, or the bolt cannot be engaged in the tool, which will necessarily require the intervention of maintenance staff in the operation.

Therefore, there is a need in the art to provide a tool or device for safely grabbing and/or moving a liner during all the steps involving the removal of the liner from, and the installation of the line in, a specific location on the inner surface of the shell of a mill, without there being any risk of the liner detaching and falling when it is loosened from the casing, removed from its position, moved so as to removed same from inside the mill, or when it is grabbed from a position for manipulation and installation on the surface of the shell of a mill, such that said manipulation and operation is performed remotely and automatically, the configuration of which allows preventing the staff from having to perform strenuous activities under constant exposure to different process risks, the low the performance of the operation involving the use of the methods and equipment used in the art, such that the operation can be carried out in an automatic manner with optimal trajectories, greater precision, and increased safety.

SUMMARY OF THE INVENTION

The object of the present invention relates to providing a device or tool for being secured to a manipulator and for grabbing the liners of a mill that must be installed in, and/or removed from, the surface of the shell of the mill, the configuration of which allows safely manipulating said liner in all operations which involve removing and installing same, secured to the tool, in an automated and remote manner, providing the method with a greater degree of certainty and efficacy, therefore optimising the time that the mill is halted for maintenance, as well as preventing the risks to which maintenance staff may be subjected.

The invention relates to a device or tool (1) for gripping a liner to remove same from, and install same in, the shell of a mill, which comprises a rigid structure or frame (2) forming a support for containing the components needed for the operation thereof, a coupling element (6) that allows the device to be secured or disposed on at least one end of a manipulation device, such as a robotic manipulator, comprises at least one claw or pincer (7) for holding at least one bolt by the head, the tool being designed to allow the adjustment of the relative position thereof in order to align the pincers to the positions of the holes of each liner, the at least one pincer (7) having a configuration allowing said claws to open and close so as to adjust the size thereof to the size of the bolt being gripped, wherein the at least one pincer or claw (7) has at least one sensor which allows determining the effective distance of the pincers (7) with respect to one another and to the frame, which allows verifying whether the claw (7) is in effect open or closed, which allows verifying whether or not the bolt is in position inside the claw, and which allows verifying whether the bolt is in the correct position or axially or radially shifted in an incorrect position.

With the configuration of the device or tool (1) for gripping a liner to remove same from, and install same in, the shell of a mill of the present invention, mill liners are installed and removed, the tool being based on the fastening elements that hold the liners in position, and this is achieved by holding the bolts at the exact distance at which they will be installed, which in turn corresponds to the same distance of the perforations of the liners, according to a command given through a program of a controller, in which each of the liners comprised in the mill is identified in terms of its disposition, location, shape, and configuration, thereby providing a remotely-operated, automated device for gripping and manipulating a liner, furthermore ensuring the correct insertion of each liner, achieving a greater degree of certainty and efficacy, therefore optimising the time that the mill is halted for maintenance, and preventing the exposure of maintenance staff to the risks associated with this type of method.

DESCRIPTION OF THE DRAWINGS

In order to help to better understand the features of the invention according to a preferred practical embodiment thereof, a set of drawings is attached as an integral part of the description in which the invention is depicted in an illustrative and non-limiting manner.

PREFERRED EMBODIMENT OF THE INVENTION

Figure 1:
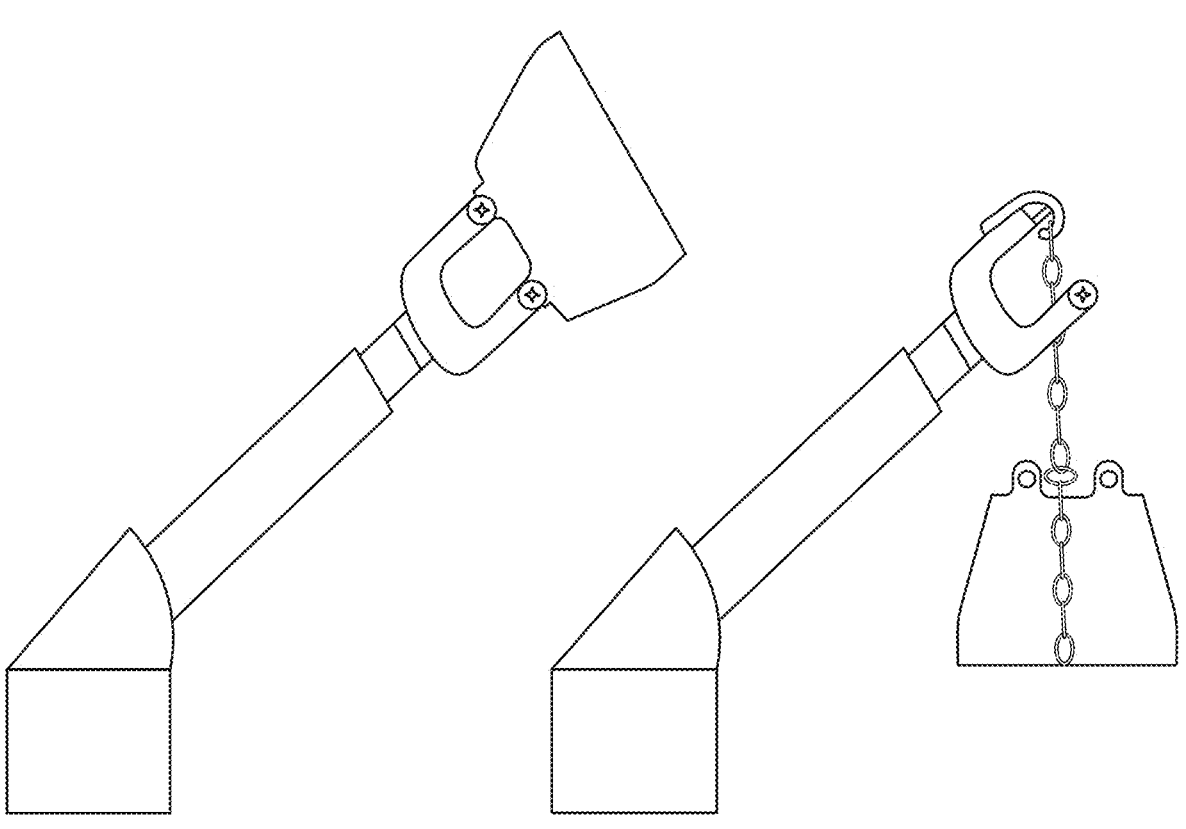
FIG. 1 corresponds to a side view of tools representing the prior art.
Figure 1A:
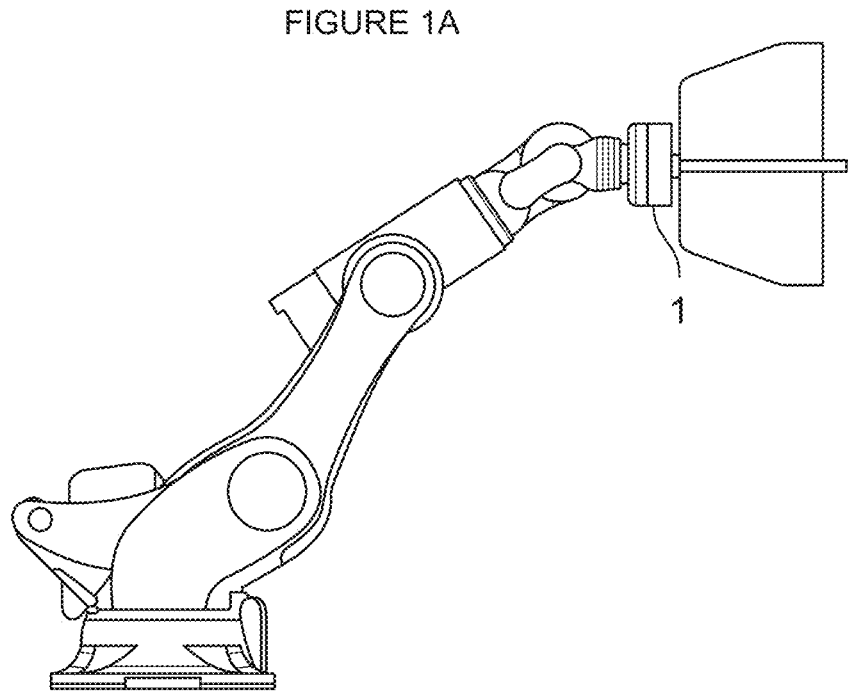
FIG. 1a corresponds to a side view of the tool or device for manipulating a liner attached to a manipulator, in which a new liner is shown.
Figure 1B:
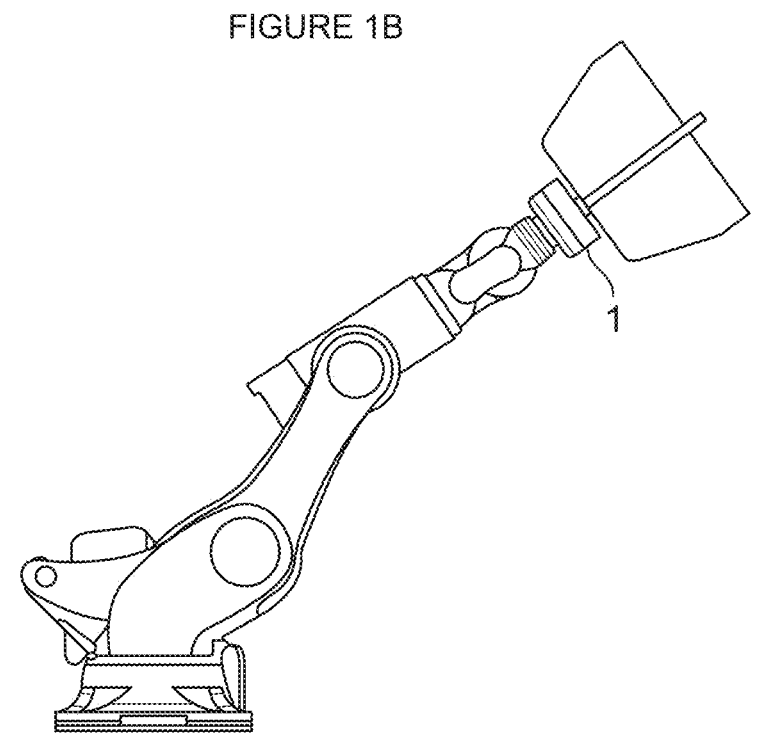
FIG. 1b corresponds to a side view of the tool or device for manipulating a liner attached to a manipulator, in which a used liner is shown.

The invention relates to a device or tool (1) for gripping a liner to remove same from, and install same in, the shell of a mill, which comprises a rigid structure or frame (2) (FIGS. 1*a* and 1*b*), comprising a base (3) defining the front face (see FIG. 4) of the device or tool (1) and side walls (4) surrounding the entire base, forming a support for containing the components needed for the operation thereof. The frame comprises a support plate (5) having a coupling element (6), defining the rear face of the device or tool (1) (FIGS. 2 and 3), that allows the device to be secured or disposed on at least one end of a manipulation device, such as a robotic manipulator with six degrees of freedom.

The device or tool (1) comprises at least one claw or pincer (7) for holding at least one bolt by the head, disposed in the frame (2) such that at least one opening (8) of the base (3) is exposed. The tool may comprise a plurality of claws or pincers (FIG. 4).

Figure 2:
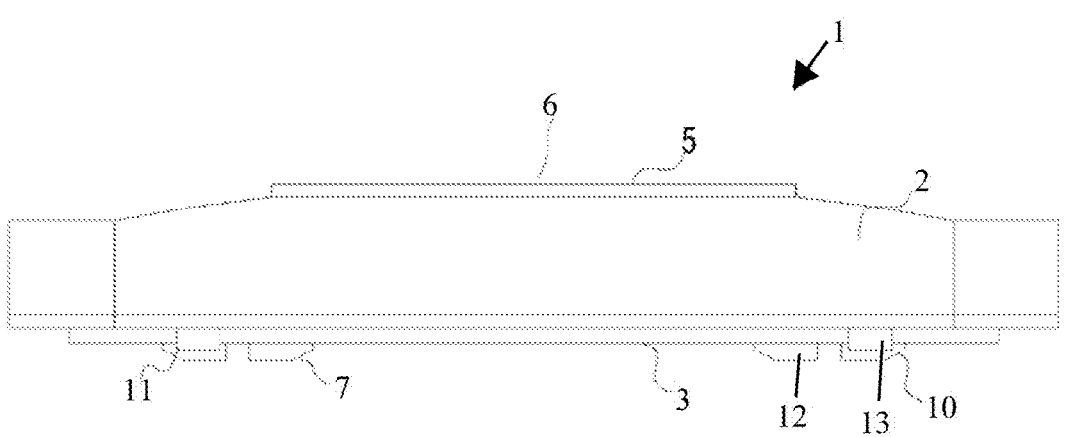
FIG. 2 corresponds to a side view of a longitudinal section of the device for manipulating a liner of the present invention.
Figure 3:
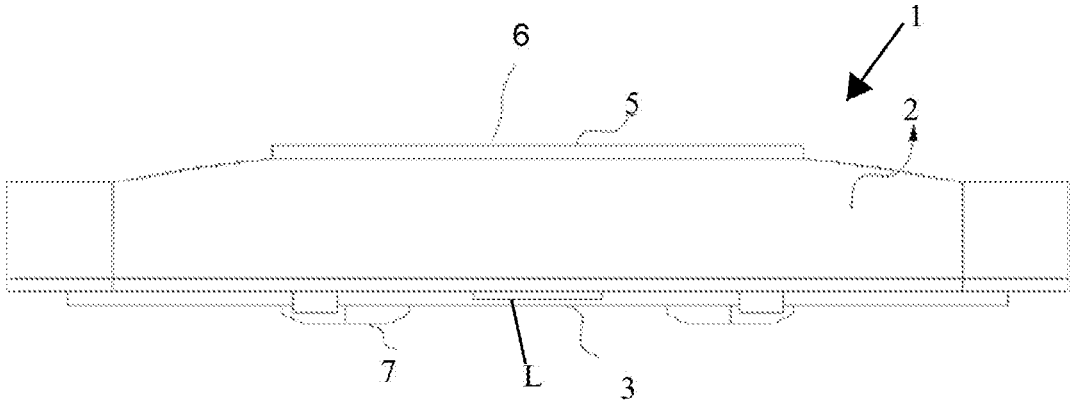
FIG. 3 corresponds to a side view of a longitudinal section of the device for manipulating a liner with the claws of the present invention closed.
Figure 4:
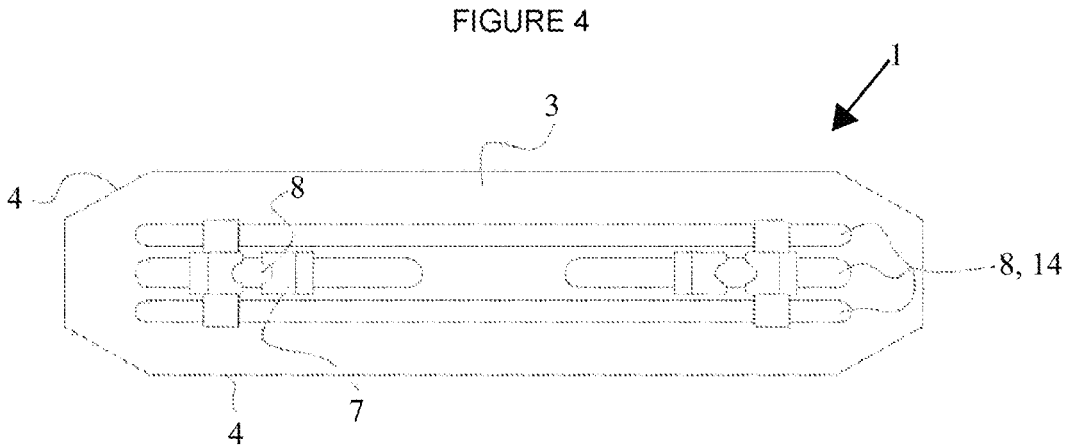
FIG. 4 corresponds to a top plan view of the device for manipulating a liner according to the invention.

The at least one claw or pincer (7) has a configuration allowing the adjustment of the relative position thereof in order to align the pincers to the positions of the holes of each liner, which can be performed interchangeably by mechanical screw actuation, rack and pinion, or else a hydraulic or electric linear actuator (9), the latter being illustrated by way of example in FIGS. 2 and 4).

The shape and configuration of the at least one pincers (7) allow opening and closing said claws so as to adjust the size thereof to the size of the bolt being gripped, such that they are operated to open or close with the force needed for grabbing or releasing a liner bolt, where necessary. The actuation for opening or closing the pincers can be performed interchangeably by means of mechanical screw actuation, gears, or else a hydraulic, pneumatic, or electric linear actuator, as necessary.

The at least one pincer or claw (7) has at least one sensor (FIGS. 2 and 4), such as at least one position sensor (10), which allows determining the effective distance of the pincers (7) with respect to one another and to the frame, at least one claw sensor (11) which allows verifying whether the claw (7) is in effect open or closed, at least one bolt sensor (12) which allows verifying whether or not the bolt is in position inside the claw, and at least one alignment sensor (13) which allows verifying whether the bolt is in the correct position or axially or radially shifted in an incorrect position.

The method for installing a liner by means of using the device or tool (1) for gripping liners starts with the command which is made through a computer of a control system such that the device receives information about the liner to be installed and the disposition of the bolts thereof, which is recorded in the computer, with this command the manipulator, in which said device (1) for gripping liners is installed, such as preferably an automated robotic manipulator, such as those used by the applicant of the present invention, moves the device (1) to the position of at least one bolt feeder (14), the distance between the claws (7) which may be comprised in the device is adjusted so as to coincide with the distance between the bolts, and this is carried out by means of actuating the at least one mechanical screw actuation means, gears, or else a hydraulic, pneumatic, or electric linear actuator (9), according to the type of liner to be changed according to the command given by the controller, such that in operation the bolts are introduced one-by-one in the different claws (7) which may be comprised in the device (1). Through the detection of at least one sensor (10, 11, 12, 13), the correct position between the claws (7) comprised in the device is detected and verified and said sensor also allows detecting the bolt and verifying that it is in the correct position, commanding the closure of the claw (7) for holding the bolt. The manipulator continues to feed the other claws (7) with bolts according to the type of liner that will be installed, in such a manner that once all the required claws (7) are required with bolts, the manipulator shifts out of the bolt feeding area and is disposed for grabbing the liner in the area of a liner feeder, the manipulator moves the device (1) for gripping with bolts secured in the claws and grabs the liner by means of inserting these bolts through the orifices of the liner, and positions same in the specific location on the surface of the shell of the mill.

In an alternative form of the invention and in order to ensure the movement position of the liner grabbed by the device (1) for gripping, the computer allows lifting or hoisting the liner such that it is disposed at an angle which ensures its movement position, where the device (1) for gripping may further comprise an auxiliary system consisting of support arms or holding claws which allow the liner to be held in position.

The manipulator then brings the liner to its installation position, which is clearly identified and commanded by the controller, moves the bolts held in the claws (7) of the device (1) closer to their final position, aligning same with the orifices of the mill, introducing the bolts in said orifices causing the threaded opposite end of said bolts to be exposed on the external side of the mill, thereby positioning the liner in the position initially commanded for the final placement thereof. Nuts and washers are then installed or on the outside of the mill, in such a manner that once the nuts are installed, the claw (7) supporting the bolt receives information to loosen it, and this is successively performed with the rest of the bolts and their respective holding claws until the device is free of the task, with the liner thus being finally installed in the position initially commanded by the controller.

The process for taking out and/or removing a liner comprises receiving information about which liner is to be installed and the disposition of the bolts thereof, the distance between claws is adjusted to coincide with the distance between bolts, which is correctly verified and detected by at least one sensor, the manipulator brings the device (1) to the position in which the shafts of the bolts are aligned with the claws or pincers (7), the device (1) holds the liner either by means of an auxiliary claw, a lower support, an electromagnet, or else by means of pushing it against the shell, the nuts are loosened one-by-one on the outside of the mill, and the bolts are pushed into the mill, every time the head of a bolt enters the claw (7), the latter detects the presence of this element and proceeds to close, and this is detected and verified by at least one sensor, whereby the holding thereof is achieved. Once all the bolts have been released, pushed, and held by the claws (7), the manipulator proceeds to finally detach the liner from the shell of the mill and takes it out of said position, to be moved to the liner feeder device which finally removes it from the area together with the bolts.

The device or tool (1) for gripping a liner to remove same from, and install same in, the shell of a mill may comprise a control system which allows operating and controlling said device for changing the liners of the present invention, having the function of providing power and controlling the device in communication with the manipulator to which it is attached, furthermore having monitoring controls. The control system has at least one switchgear or SG, control panel or CP, control cabinets, position detection panel PDP and human-machine interface or HMI, hydraulic installation, inductive sensors, encoder, among other control means.

In one embodiment of the invention, the device (1) for gripping liners may comprise detection means for detecting the position of the liner configured by at least one machine vision system which is based on machine vision techniques by means of using laser triangulation cameras (L) through which scanning of the mantle of the inner surface of the mill is performed to determine the position in which the liner should be inserted or from which it should be removed, said machine vision system being capable of delivering the distance and angle of the succession of holes, so that the manipulator can make a decision concerning insertion and approach.

The configuration of the device or tool (1) for gripping a liner to remove same from, and install same in, the shell of a mill of the present invention allows mill liners to be installed and removed, the tool being based on the fastening elements that hold the liners in position, and this is achieved by holding the bolts at the exact distance at which they will be installed, which in turn corresponds to the same distance of the perforations of the liners; in this manner, the tool can lift the liner by introducing the bolts inside same and moving it to its installation position in a safe and accurate manner without the need for human interaction in the process and without regard to the deformations that the liners may experience. When removing the liner, the device (1) is positioned at the exact distance where there are arranged fastening elements which, when removed, are held by the device (1), generating the necessary interference to be able to lift the worn liner without having to throw the liner on the floor of the mill. Therefore, the liner is but an additional element among the components to be held, in addition to preventing the liner from falling to the floor at the moment of removing it, along with the elimination of the need for staff in the process.

Although the configuration of the device or tool (1) for gripping a liner to remove same from, and install same in, the shell of a mill herein described constitutes a preferred inclusion of this invention, it must be understood that the invention is not limited to this specific form of the system for changing the liner, given that changes can be made therein without departing from the scope of the invention defined in the attached claims.

The invention claimed is:

1. A device for gripping a liner to remove the liner from and install the liner in a shell of a mill, the device comprising:
   a frame configured for storage;
   a control system configured to operate and control the device;
   a coupling element configured to allow the device to be secured or disposed on at least one end of a manipulation device; and
   at least one claw configured to hold at least one bolt by a head of the bolt, the device configured to allow adjustment of relative position of the device in order to align the at least one claw to a position of holes of each liner with the at least one claw configured to open and close so as to adjust the size thereof to a size of the bolt being gripped,
   wherein the at least one claw has at least one sensor that is configured to determine an effective distance of the at least one claw with respect to one another and to the frame, and the at least one sensor being configured to verify whether the at least one claw is in an open or a closed position, which in turn verifies the position of the bolt with respect to the at least one claw and which verifies whether the bolt is in a correct position or axially or radially shifted in an incorrect position and wherein the control system provides power, controls the device in communication with the manipulation device to which the control system is attached, has monitoring controls, at least one switchgear, a control panel, control cabinets, position detection panel, a human-machine interface, a hydraulic installation, inductive sensors, and an encoder.

2. The device for gripping a liner to remove the liner from and install the liner in a shell of a mill according to claim 1, wherein the frame comprises a base defining a front face and sidewalls surrounding an entirety of the base and a support plate with the coupling element defining a rear face of the device.

3. The device for gripping a liner to remove the liner from and install the liner in a shell of a mill, according to claim 2, wherein the at least one claw is disposed in the frame in such a manner that at least one opening of the base is exposed.

4. The device for gripping a liner to remove the liner from and install the liner in a shell of a mill according to claim 1, wherein an adjustment of the position of the at least one claw is configured to be performed interchangeably by mechanical screw actuation, rack and pinion, or a hydraulic or electric linear actuator.

5. The device for gripping a liner to remove the liner from and install the liner in a shell of a mill according to claim 1, wherein the at least one sensor is at least one position sensor and/or at least one claw sensor.

6. A method for installing a liner by at least one device for gripping liners, comprising the following steps:
   initiating a command through a computer of a control system in such a manner that the device receives information about the liner to be installed and disposition of bolts thereof, which is recorded by the computer;
   moving a manipulator, in which said device is installed by the command to at least one bolt feeder;
   adjusting a distance between at least one claw of the device in relation to another one of the at least one claw of the device so as to coincide with a distance between the bolts;
   introducing the bolts one-by-one in the one of the at least one claw and/or the another one of the at least one claw;
   detecting a correct position between the at least one claw and the another one of the at least claw by at least one sensor;
   detecting the bolts and verifying that the bolts are in the correct position;
   commanding closure of the at least one claw to hold one of the bolts, the manipulator continues to feed the other of the at least one claw with the bolts according to the liner that will be installed in such a manner that once all claws of the at least one claw that are required are provided with the bolts, the manipulator shifts out of a bolt feeding area and is disposed for grabbing the liner in the area of a liner feeder; and
   moving the device with the manipulator to grab the liner and inserting the bolts secured within the at least one claw and/or another one of the at least one claw through orifices of the liner and positioning the liner on the surface of a shell of a mill.

7. The method for installing a liner according to claim 6, wherein the manipulator brings the liner to an installation position, moves the bolts held in the at least one claw of the device closer to the bolts final position, aligning the bolts with the orifices of the mill, introducing the bolts in said orifices causing a threaded end of the bolts to be exposed on an external side of the mill, thereby positioning the liner in a position initially commanded for final location of the liner.

8. The method for installing a liner according to claim 6, wherein nuts and washers are installed on an outside of the mill, and once the nuts are installed, the at least one claw supporting one of the bolts receives information to loosen the one of the bolts while a remaining number of the bolts and the at least one claw holding each of the bolts remaining are at a rest position until the device completes loosening the one of the bolts, and, with the liner being installed in a position initially commanded by a controller.

9. The method for installing a liner according to claim 6, wherein in order to ensure movement position of the liner grabbed by the device, the computer allows lifting or hoisting the liner in such a manner that the liner is disposed at an angle which ensures movement position of the liner.

10. A method for removing a liner using at least one device-for gripping liners, comprising the following steps:

receiving information about the liner to be installed and disposition of bolts of the liner;

adjusting a distance between at least one claw to coincide with a distance between the bolts, which is verified and detected by at least one sensor;

bringing the device to a position in which shafts of the bolts are aligned with the at least one claw with the manipulator device;

loosening nuts one-by-one on an outside of the mill;

pushing the bolts into the mil every time a head of one of the bolts enters the at least one claw, the at least one claw detecting a presence of the head of the one of the bolts and proceeds to close, closure of the at least one claw is detected and verified by at least one sensor, whereby holding of all of the bolts is achieved once all of the bolts have been released, pushed, and held by each of the at least one claw; and detaching the liner from a shell of a mill and taking the liner out of a position to be moved to a liner feeder device which finally removes the liner together with the bolts.

11. The method for removing a liner according to claim 6, wherein in order to ensure movement position of the liner grabbed by the device for gripping, the computer allows lifting or hoisting the liner in such a manner that the liner is disposed at an angle which ensures the liner's movement position.

* * * * *